April 4, 1950  C. A. WARNKE  2,502,769
RAKE AND CONVEYER TEETH
Filed May 28, 1946

CLEMENES A. WARNKE, Inventor

By Bailey, Stephens & Huettig
Attorneys

Patented Apr. 4, 1950

2,502,769

UNITED STATES PATENT OFFICE 2,502,769

RAKE AND CONVEYER TEETH

Clemenes A. Warnke, Grand Rapids, Mich.

Application May 28, 1946, Serial No. 672,766

8 Claims. (Cl. 56—400)

This invention relates to the construction of a rake or conveyor tooth and the mounting thereof. Such teeth are particularly usable in harvesting machines of the bean or peanut harvester type, an example of which is illustrated in my Patent Number 2,151,289, March 21, 1939.

In harvesting machines the rake teeth are subject to severe use. In some functions of the machine they serve to rake material along the ground, and in other functions they act as part of the conveyor mechanism in elevating material picked up from the ground. An object of this invention is to construct a rake tooth which has sufficient resiliency while at the same time is rugged enough to withstand severe wear and tear while being used either as a rake or conveyor element. A further object of the invention is to provide a mounting for the tooth which firmly holds the tooth in position despite the pulling and vibration to which the tooth is subjected, while not impairing the resilient qualities of the tooth.

The means by which these objects are obtained are described in detail with reference to the accompanying drawings, in which.

Each rake tooth 2 is made from a rod of spring steel bent midway of its length to form a bight 4, oppositely extending double convolutions forming coils 6 and 8, respectively, the free ends of the rod projecting in the plane of the bight 4 to form the prongs 10 and 12. The lower end of the bight extends to a plane which is perpendicular to the plane of the bight and is tangent to the convolutions. In other words, the convolutions and bight can be seated upon a flat surface.

Figure 2:
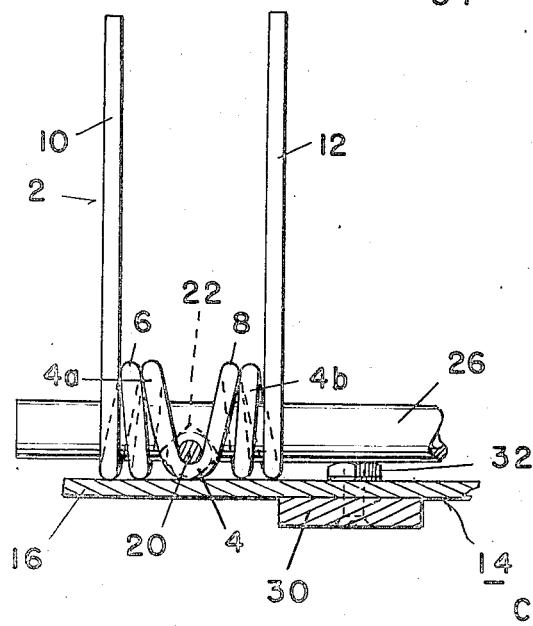
Figure 2 is a cross-sectional view on the line 2—2, Figure 1.

An angle iron 14 with flanges 16 and 18 serves as the support upon which the tooth is mounted. The bight 4 is placed against flange 18, and secured thereto by bolt 20, the head 22 of which engages the legs 4a, 4b, Figure 2, of the bight. A nut 24 on bolt 20 draws head 22 against bight 4. At the same time, coils 6 and 8 and prongs 10 and 12 are drawn tightly against flange 18 thus forming a secure support for the rake tooth.

Figure 3:
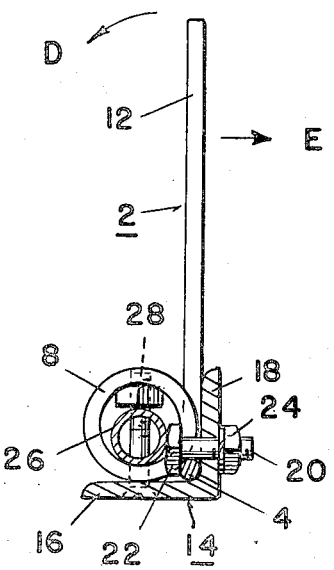
Figure 3 is a cross-sectional view on the line 3—3, Figure 1.

The rake teeth 2 are secured to flange 16 of angle 14 by means of a rod 26, illustrated as a pipe, of less diameter than the inner diameter of coils 6 and 8. At points along its length, pipe 26 is fastened to flange 16 by bolts 28. By reason of this construction the coils 6 and 8 are firmly held on flange 16 while permitting some degree of elasticity or give in the coils 6 and 8 when prongs 10 and 12 are sprung in the direction of the arc D, Figure 3, while moving material such as bean or peanut vines. The teeth are illustrated in their conveyor function position and the whole assembly is moved in the direction E, indicated in Figure 3. Pressure against the prongs will tend to tighten the coils 6 or 8, the resilient effort against displacement being correspondingly increased. Rod 26 prevents the coils from the warping or twisting along the length of the coils which would cause the bight to work loose of bolt 20. Rod 26 also bears against bolthead 22 and so forms a reinforcing means for holding bight 4 tightly against flange 18, and lessening the chance of the tooth becoming loose on its mounting because of vibration.

Figure 1:
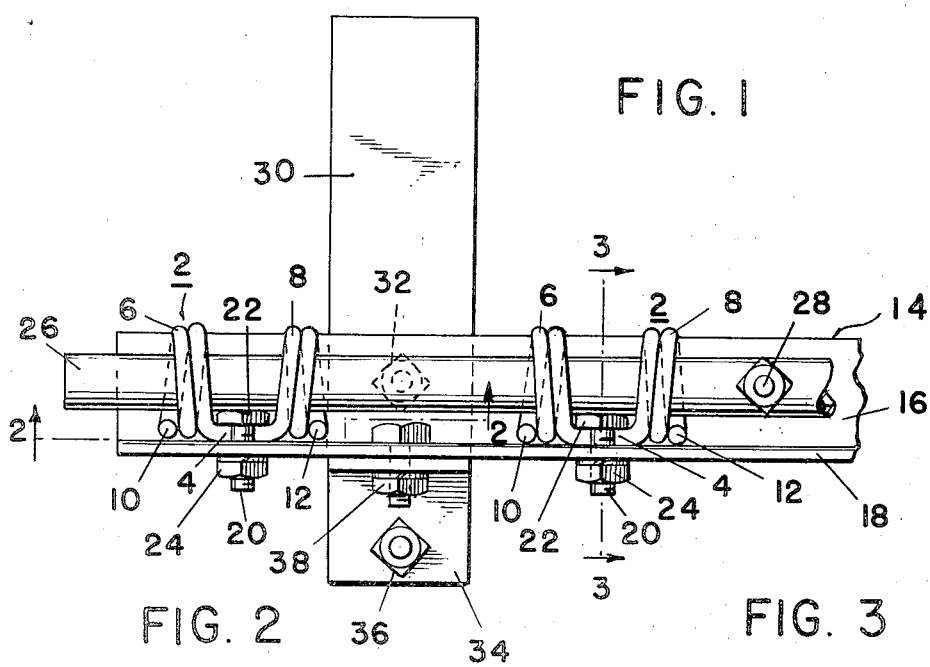
Figure 1 is a plan view showing the rake teeth and the mounting therefor.

The mounting construction described is useful generally in all machines having rake or conveyor teeth. It is particularly useful in machines of the type shown in my prior Patent Number 2,151,289, wherein the rake teeth mounting is actuated by a cam. Thus, angle 14 has a cam shoe 30 secured to flange 16 by bolt 32, and reinforced by an angle 34 secured to shoe 30 by bolt 36, and to flange 18 by bolt 38, Figure 1.

Having described the means by which the objects of my invention are obtained, I claim:

1. A rake tooth composed of spaced coils each having double convolutions, said coils being connected by a bight, rake prongs extending from each coil and lying in the plane of said bight, and the head of said bight extending to a plane perpendicular to said plane of said bight and tangent to said coils.

2. A rake tooth mounting assembly comprising an angle iron having two flanges, a rake tooth having a coiled end seated in the angle formed by said flanges, means for securing said coil to one of said flanges, a rod member extending through said coil, and means for securing said rod member to the other of said flanges.

3. A rake tooth mounting assembly comprising an angle iron, a rake tooth having two prongs terminating in coils connected by a bight lying in the same plane as said prongs, means securing said bight to one flange of said angle iron, a rod extending through said coils, and means for securing said rod to the other of said flanges.

4. An assembly as in claim 3, in which said rod is of less diameter than the inner diameter of said coils.

5. An assembly as in claim 3 in which the means securing said bight comprises a bolt, and said rod engages said bolt.

6. A rake tooth assembly comprises an angle iron having two flanges, a rake tooth having two coils connected by a bight and rake teeth extending from said coils in the plane of said bight, said coils being seated upon one of said flanges with said bight bearing against the other of said flanges, and means for securing said bight to the other of said flanges.

7. An assembly as in claim 6 in which the head of said bight rests upon said flange on which said coils are seated.

8. An assembly as in claim 7, said rake teeth extending between said coils and said other flange and bearing in part on said other flange.

CLEMENES A. WARNKE.

REFERENCES CITED

The following references are of record in the file of this patent:

UNITED STATES PATENTS

| Number | Name | Date |
|---|---|---|
| 665,226 | Johnston | Jan. 1, 1901 |
| 954,903 | White | Apr. 12, 1910 |
| 2,040,689 | Duhain | May 12, 1936 |
| 2,328,121 | Bartek | Aug. 31, 1943 |
| 2,364,303 | Martin | Dec. 5, 1944 |

FOREIGN PATENTS

| Number | Country | Date |
|---|---|---|
| 106,985 | Great Britain | June 14, 1917 |
| 585,026 | France | Dec. 1, 1924 |